(12) United States Patent
Lee et al.

(10) Patent No.: US 7,808,569 B2
(45) Date of Patent: Oct. 5, 2010

(54) METHOD FOR MANUFACTURING PIXEL STRUCTURE

(75) Inventors: Yi-Wei Lee, Taoyuan (TW); Ching-Yun Chu, Taoyuan (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 12/477,328

(22) Filed: Jun. 3, 2009

(65) Prior Publication Data
US 2009/0246919 A1 Oct. 1, 2009

Related U.S. Application Data

(62) Division of application No. 11/433,017, filed on May 12, 2006, now Pat. No. 7,580,087.

(30) Foreign Application Priority Data

Dec. 30, 2005 (TW) .............................. 94147530 A

(51) Int. Cl.
G02F 1/136 (2006.01)
G02F 1/1343 (2006.01)
(52) U.S. Cl. .......................... 349/43; 349/143
(58) Field of Classification Search .................. 349/43, 349/143
See application file for complete search history.

(56) References Cited

U.S. PATENT DOCUMENTS

| 6,531,330 | B2 * | 3/2003 | Lay et al. | 438/30 |
| 7,056,777 | B2 * | 6/2006 | Kim et al. | 438/158 |
| 7,223,672 | B2 * | 5/2007 | Kazlas et al. | 438/458 |
| 7,256,076 | B2 * | 8/2007 | Cho et al. | 438/151 |

* cited by examiner

Primary Examiner—Mike Qi
(74) Attorney, Agent, or Firm—J.C. Patents

(57) ABSTRACT

A method for manufacturing a pixel structure includes forming a first conductive layer on a substrate and patterning the first conductive layer with use of a first mask as an etching mask to form a gate. A dielectric layer is formed over the substrate to cover the gate. A semiconductor material layer is formed on the dielectric layer and patterned with use of the first mask as an etching mask to form a semiconductor layer on the dielectric layer. A second conductive layer is formed over the substrate and patterned with use of a second mask as an etching mask to form a source/drain over the substrate. A third conductive layer is formed over the substrate and patterned with use of a third mask as an etching mask to form a pixel electrode over the substrate. The pixel electrode is electrically connected to the drain.

4 Claims, 17 Drawing Sheets

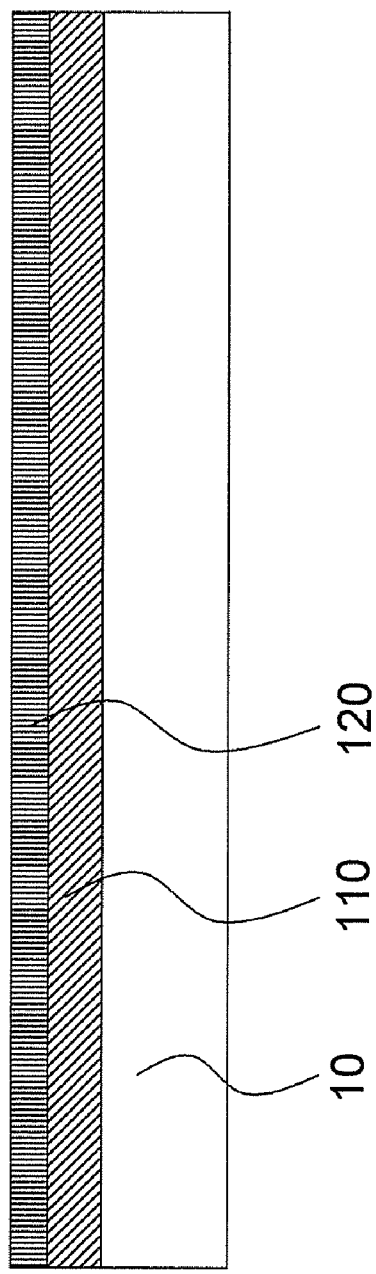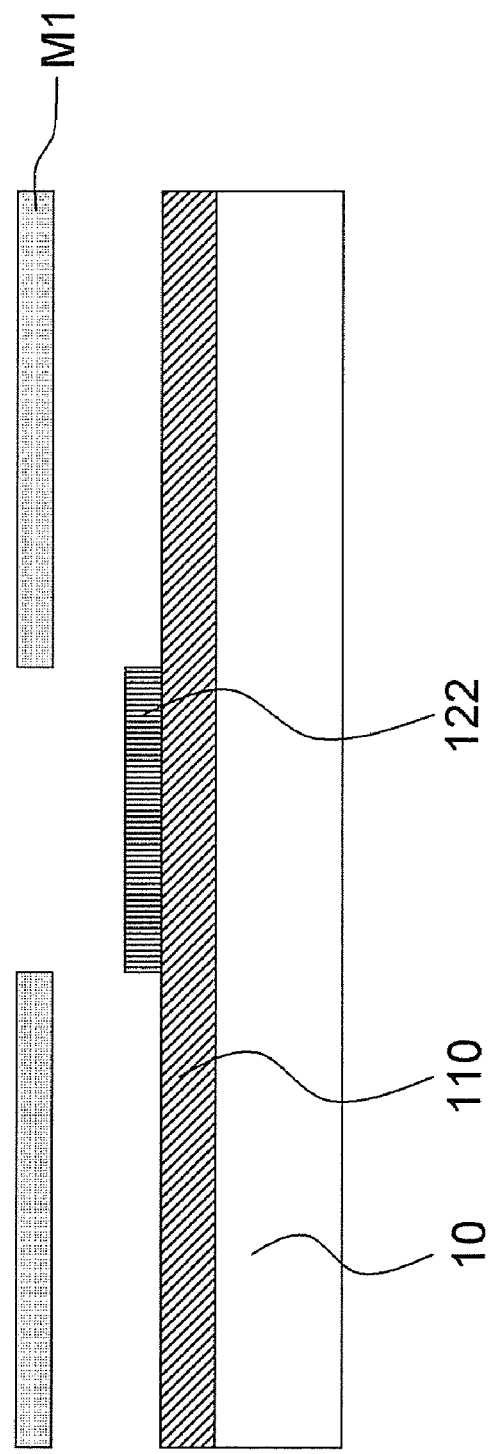

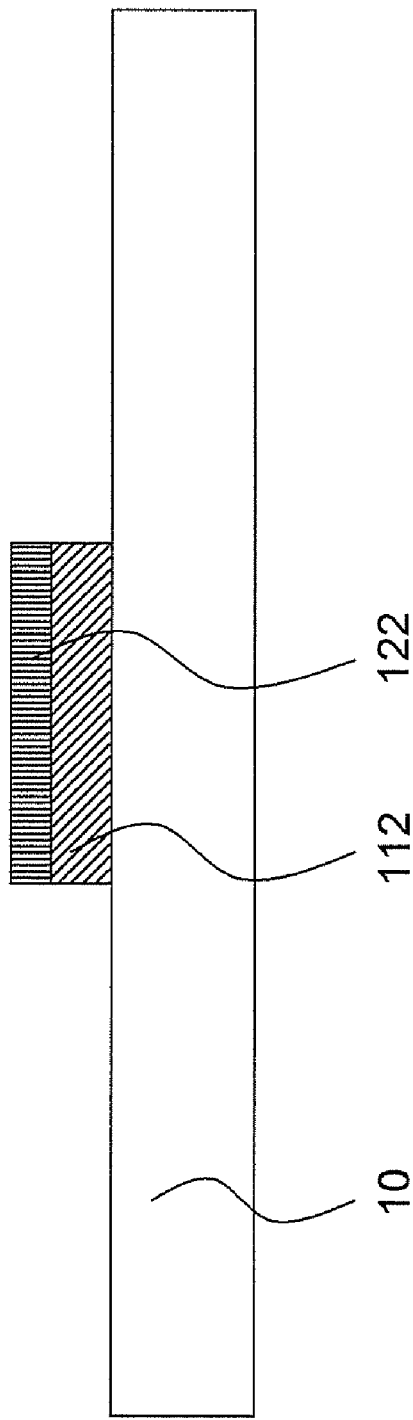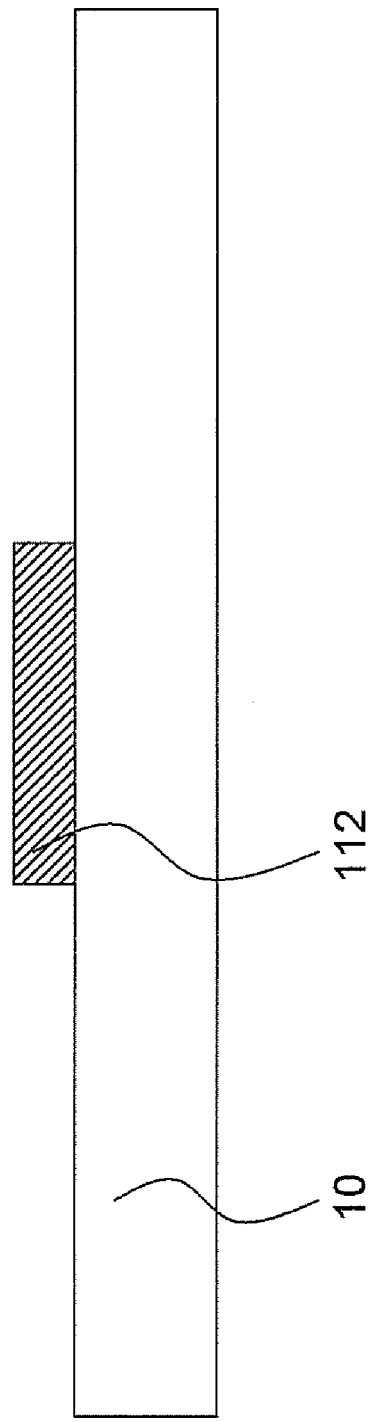

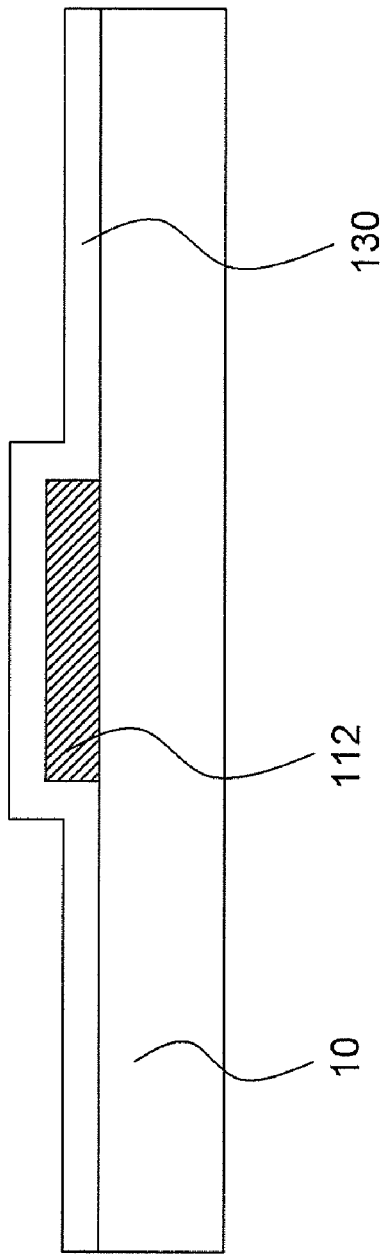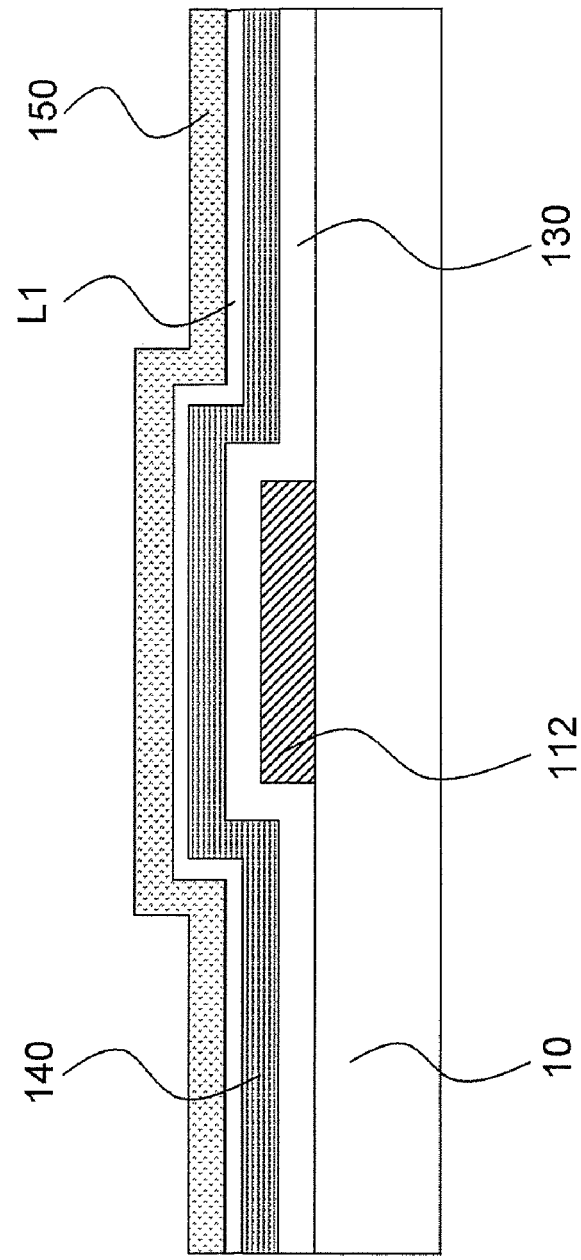

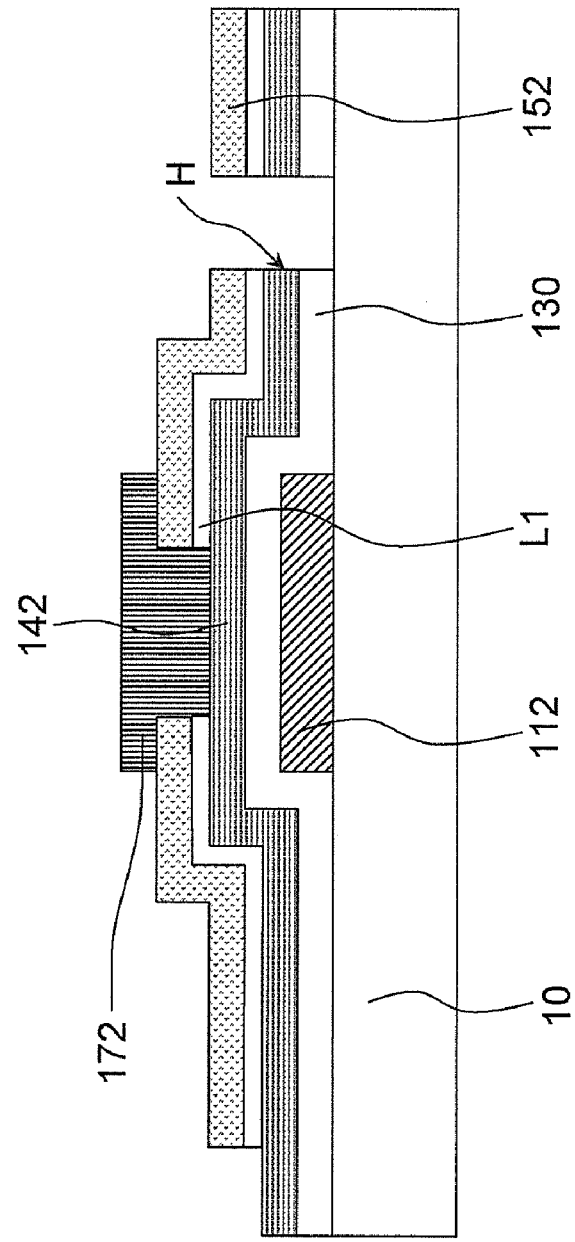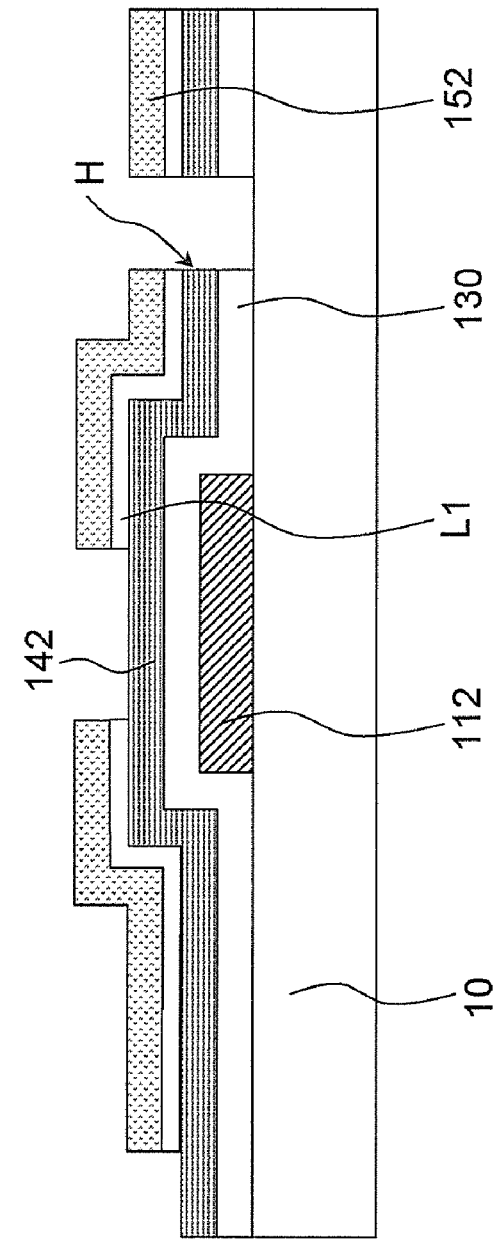

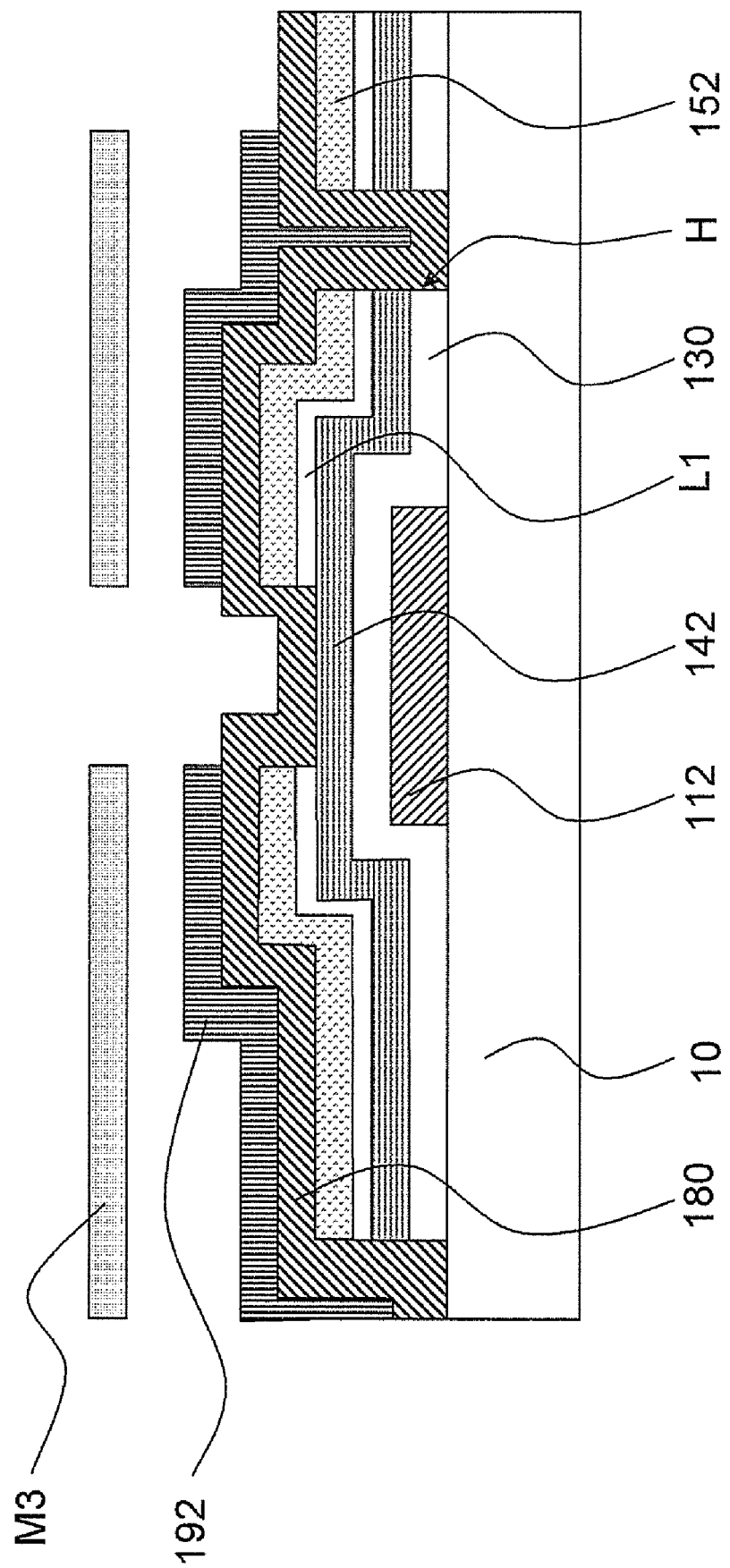

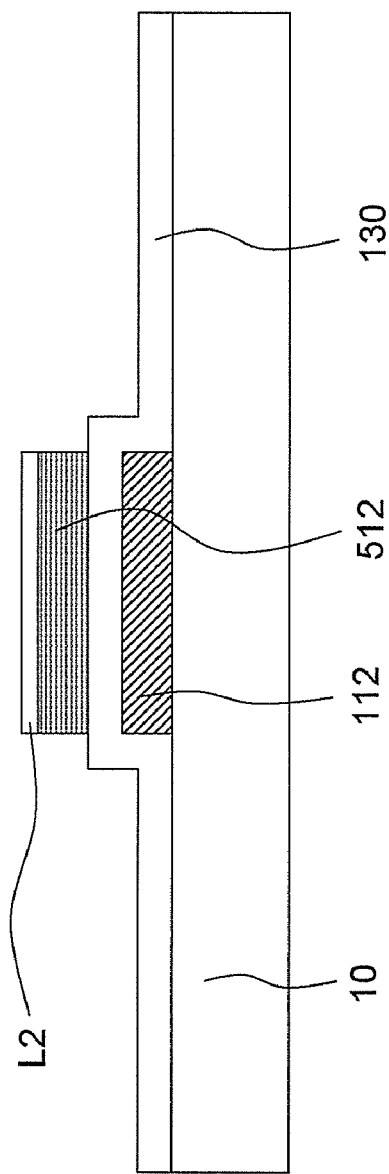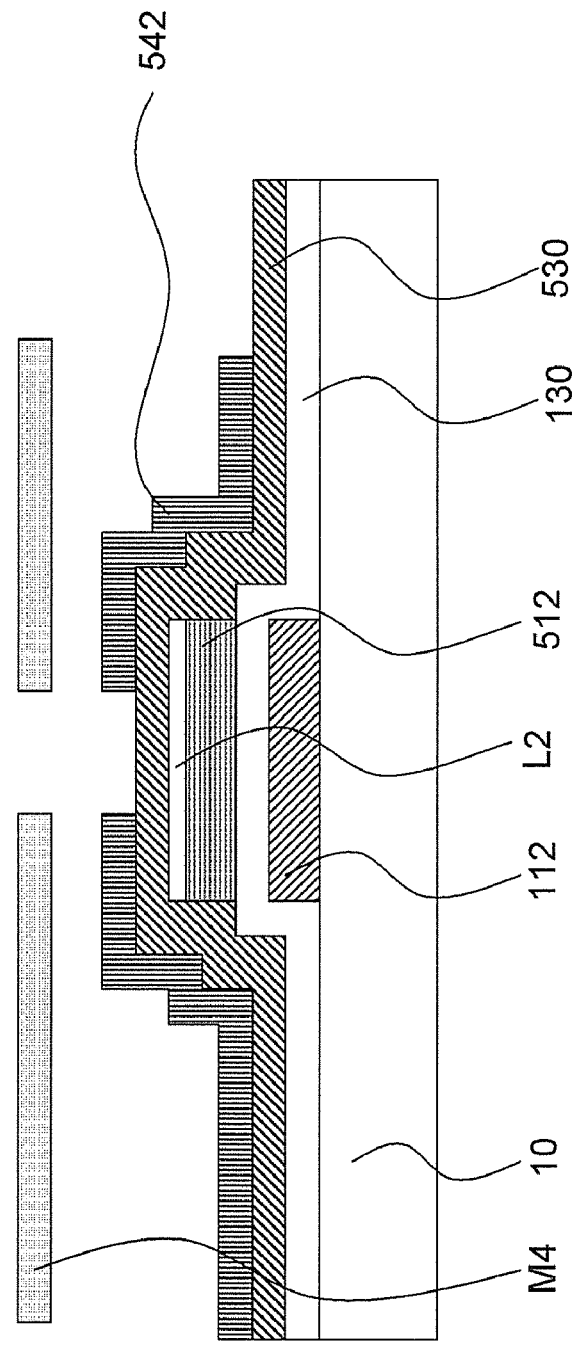

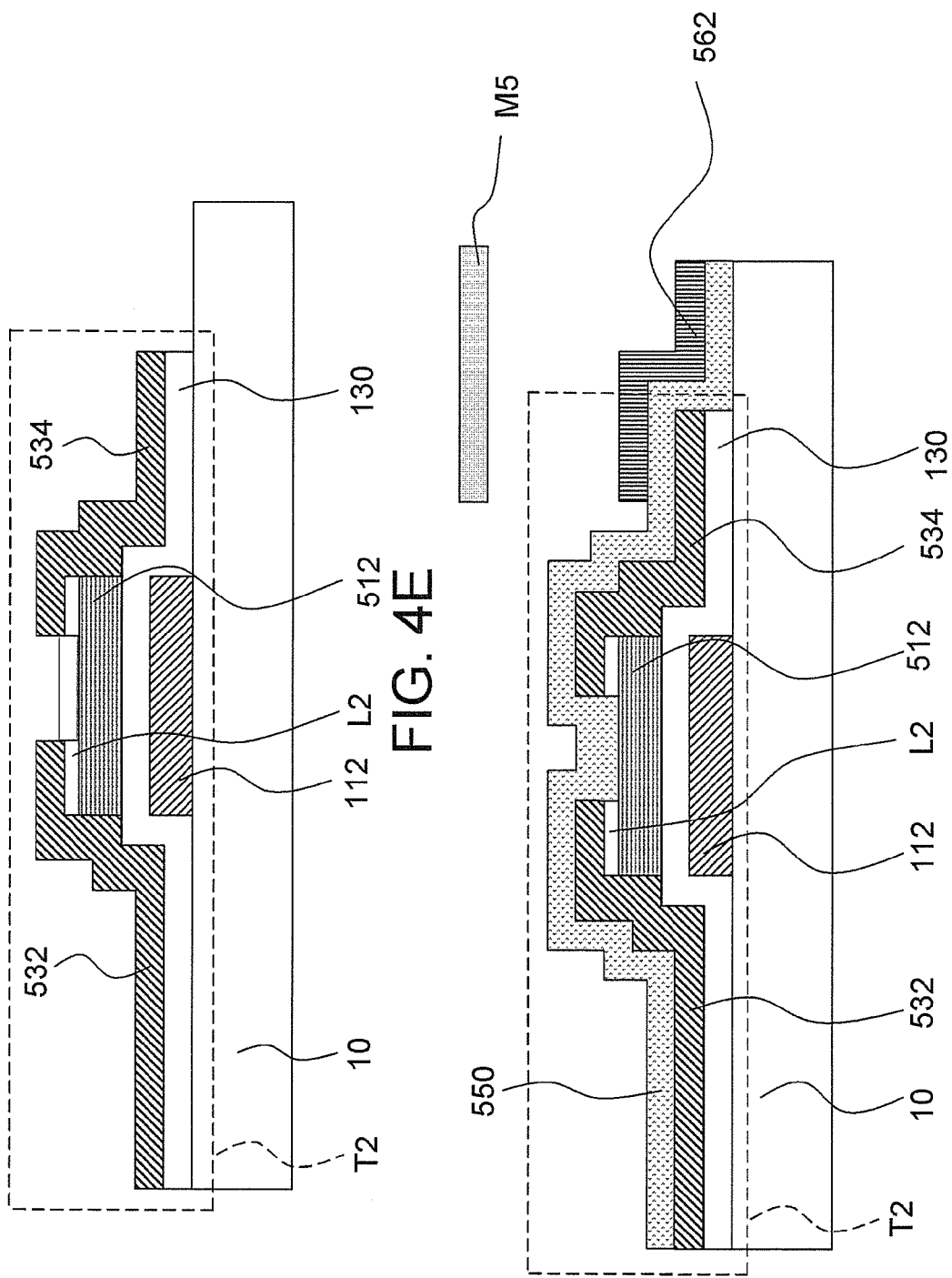

METHOD FOR MANUFACTURING PIXEL STRUCTURE

CROSS-REFERENCE TO RELATED APPLICATION

This application is a divisional of and claims priority benefit of U.S. non-provisional application Ser. No. 11/433,017, filed on May 12, 2006, now allowed, which claims the priority benefit of Taiwan application serial no. 94147530, filed on Dec. 30, 2005. The entirety of each of the above-mentioned patent applications is hereby incorporated by reference herein and made a part of this specification.

BACKGROUND OF THE INVENTION

1. Field of the Invention

The present invention relates to a method for manufacturing a pixel structure, and more particularly to a method for manufacturing a pixel structure with relatively fewer number of masks.

2. Description of Related Art

With the process of modern information technology, various types of displays have been widely in consumer electronic products such as cell phones, notebook computers, digital cameras, and personal digital assistants (PDAs). Among these displays, the liquid crystal display (LCD) and the organic electroluminescence display (OELD) have become the mainstream on the market due to their advantages of being light, small, and low in power-consumption. The manufacturing processes for both the LCD and the OELD include forming a pixel structure array over a substrate through a semiconductive process.

FIGS. 1A to 1G depict a cross-sectional flow chart of manufacturing a conventional pixel structure. First, referring to FIG. 1A, a gate 20 is formed on a substrate 10 by using a first mask (not shown). Referring to FIG. 1B, a first dielectric layer 30 is formed over the substrate 10 to cover the gate 20. Referring to FIG. 1C, a channel layer 40 is formed on the first dielectric layer 30 by using a second mask (not shown). Referring to FIG. 1D, a source 50 and a drain 60 are subsequently formed on the channel layer 40 by using a third mask (not shown). Referring to FIG. 1E, a second dielectric layer 70 is formed over the substrate 10 to cover the channel layer 40, the source 50 and the drain 60. Referring to FIG. 1F, a contact hole H is formed in the second dielectric layer 70 by using a forth mask (not shown). Referring to FIG. 1G, a pixel electrode 80 is then formed on the second dielectric layer 70 by using a fifth mask (not shown). The pixel electrode 80 is partly filled in the contact hole H and is electrically connected to the drain 60. Thus, the fabrication of the pixel structure 90 complete.

As described above, the above pixel structure 90 five-mask processes and many process steps are required, and the fabrication time is relatively long. Because of many process steps, defects may occur in the pixel structure 90, and also the fabrication yield may be substantially decreased and the overall fabrication cost may be substantially increased.

SUMMARY OF THE INVENTION

In view of this, the present invention is directed to a method for manufacturing a pixel structure using comparatively fewer mask process steps.

The present invention is further directed to a method for manufacturing a pixel structure, wherein the number of mask process steps is comparatively reduced.

In order to achieve the aforementioned or other objects, the present invention provides a method for manufacturing a pixel structure. The method for manufacturing the pixel structure includes the following steps. First, a first conductive layer is formed on a substrate. The first conductive layer is patterned to form a gate by using a first mask. Next, a dielectric layer is formed over the substrate to cover the gate. A semiconductor material layer and a second conductive layer are sequentially formed over the dielectric layer. Next, the second conductive layer is patterned to form a pixel electrode by using a second mask. A patterned photo-resist layer is formed over the substrate by using the first mask again for protecting the semiconductor material layer above the gate. Next, the semiconductor material layer is patterned to form a semiconductor layer by using the pixel electrode and the patterned photo-resist layer as masks. Then, a third conductive layer is formed over the substrate. The third conductive layer is patterned to form a source/drain by using a third mask. The drain is electrically connected to the pixel electrode.

According to one embodiment of the present invention, the step of forming the semiconductor layer further includes patterning the dielectric layer by using the pixel electrode and the patterned photo-resist layer as mask to expose a portion of the substrate.

According to one embodiment of the present invention, the step of forming the pixel electrode further includes forming a contact hole to expose a portion of the semiconductor material layer, and after the formation of the semiconductor layer, the contact hole exposes a portion of the dielectric layer.

According to one embodiment of the present invention, the method further includes forming an ohmic contact layer on the semiconductor material layer after the formation of the semiconductor material layer, and patterning the ohmic contact layer to expose a portion of the semiconductor material layer after the formation of the pixel electrode.

The present invention further provides a method for manufacturing a pixel structure. The method for manufacturing a pixel structure includes the following steps. First, a first conductive layer is formed on a substrate. The first conductive layer is patterned to form a gate by using a first mask. Next, a dielectric layer is formed over the substrate to cover the gate. A semiconductor material layer is formed on the dielectric layer. The semiconductor material layer is patterned to form a semiconductor layer on the dielectric layer by using the first mask again. Next, a second conductive layer is formed over the substrate. The second conductive layer is patterned to form a source/drain over the substrate by using a second mask. Next, a third conductive layer is formed over the substrate. The third conductive layer is patterned to form a pixel electrode over the substrate by using a third mask, wherein the pixel electrode is electrically connected to the drain.

According to one embodiment of the present invention, the step of patterning the semiconductor material layer includes the following procedures. First, a patterned photo-resist layer is formed on the semiconductor material layer by using the first mask. The semiconductor material layer is patterned to form a semiconductor layer by using the patterned photo-resist layer as a mask. Then, the patterned photo-resist layer is removed. Furthermore, the method further includes forming an ohmic contact layer on the semiconductor material layer after the formation of the semiconductor material layer, and patterning the ohmic contact layer by using the patterned photo-resist layer as a mask before patterning the semiconductor material layer.

According to one embodiment of the present invention, the step of forming the source/drain further includes patterning the dielectric layer by using the source/drain as a mask to expose a portion of the substrate.

In summary, the method for manufacturing a pixel structure provided by the present invention uses only four mask process, wherein two mask steps employ the same mask. Thus, not only the fabrication cost is effectively reduced, but also the fabrication throughput can be effectively increased. Because the method for manufacturing a pixel structure requires comparatively less number of mask steps, and therefore fabrication yield can be effectively increased.

In order to the make aforementioned and other features and advantages of the present invention more comprehensible, preferred embodiments accompanied with appended drawings are described in detail below.

BRIEF DESCRIPTION OF THE DRAWINGS

FIGS. 4A to 4G depict cross-sectional views illustrating a method for manufacturing a pixel structure according to a second embodiment.

DESCRIPTION OF EMBODIMENTS

First Embodiment

Figure 1A:
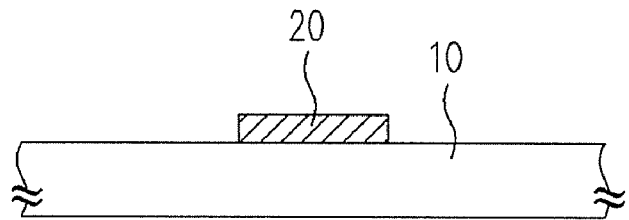
FIGS. 1A to 1G depict cross-sectional views illustrating a method for manufacturing a conventional pixel structure.
Figure 1B:
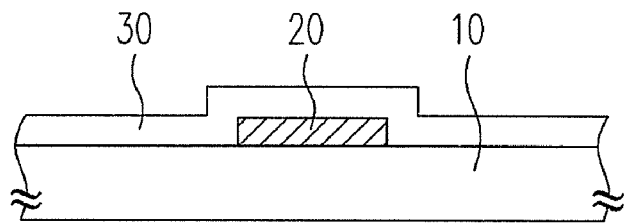
Figure 1C:
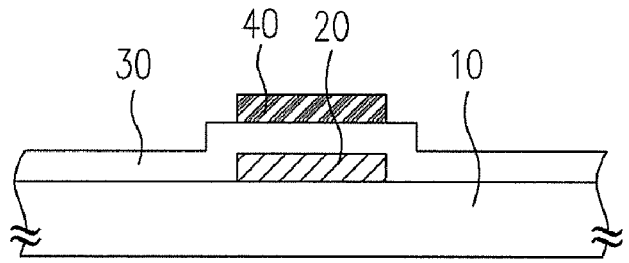
Figure 1D:
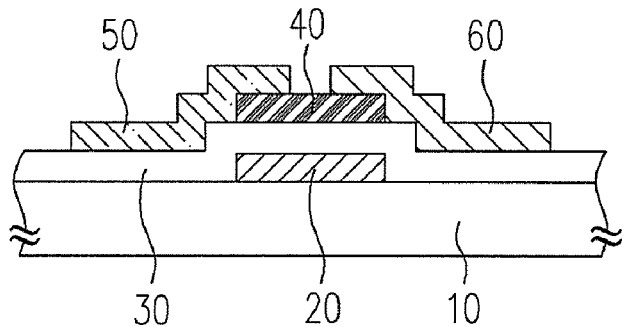
Figure 1E:
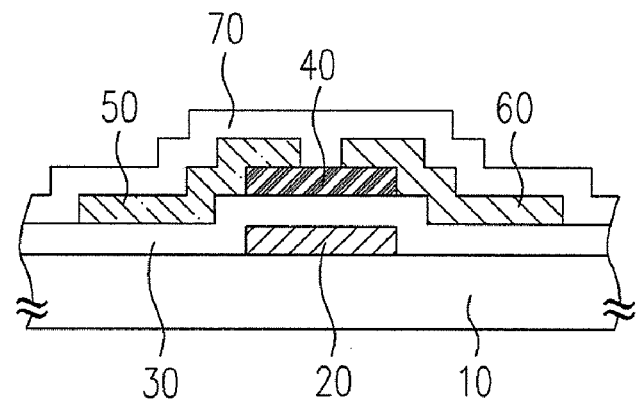
Figure 1F:
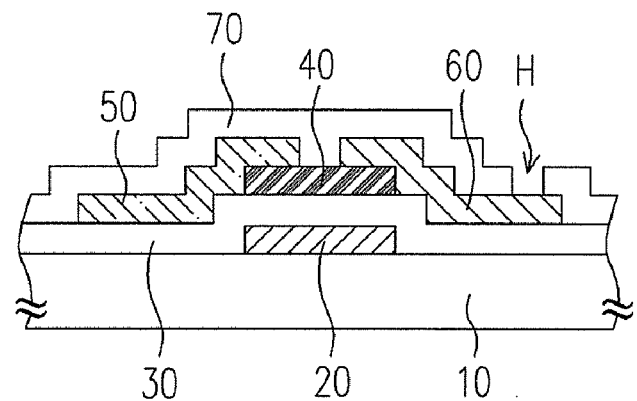
Figure 1G:
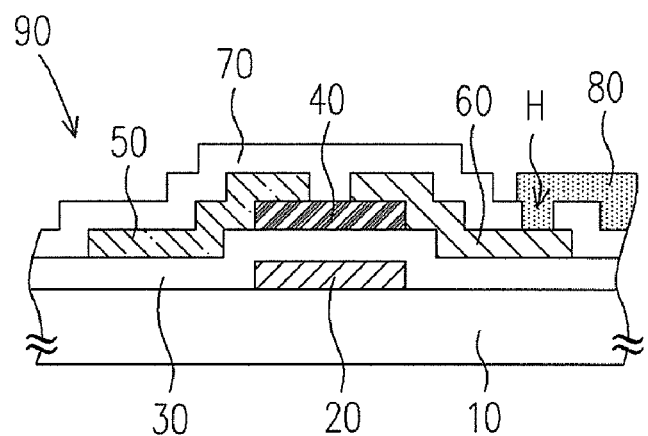
Figure 2G:
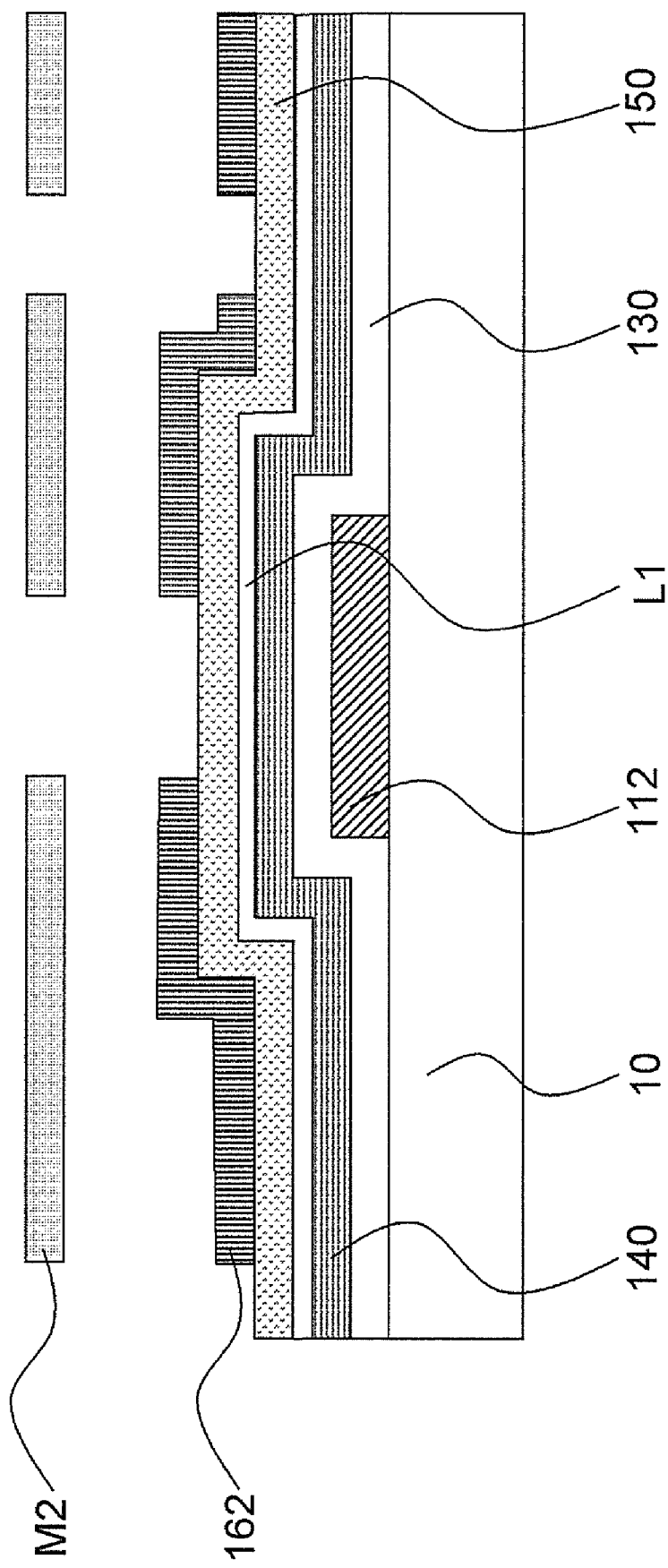
FIGS. 2A to 2N depict cross-sectional views illustrating a method for manufacturing a pixel structure according to a first embodiment of the present invention.
Figure 2H:
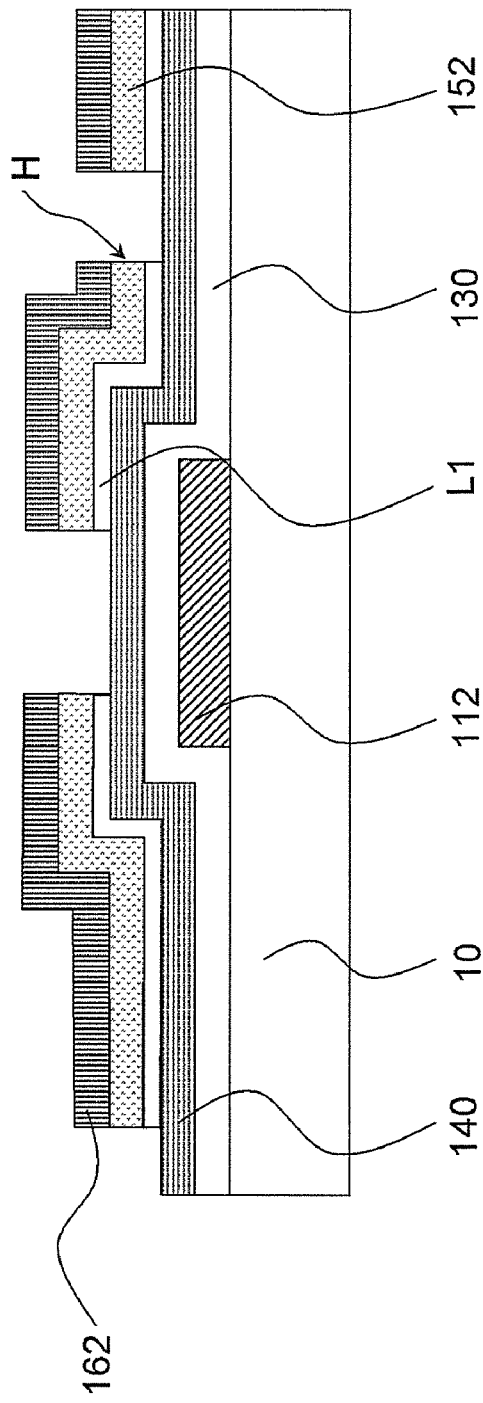
Figure 2I:
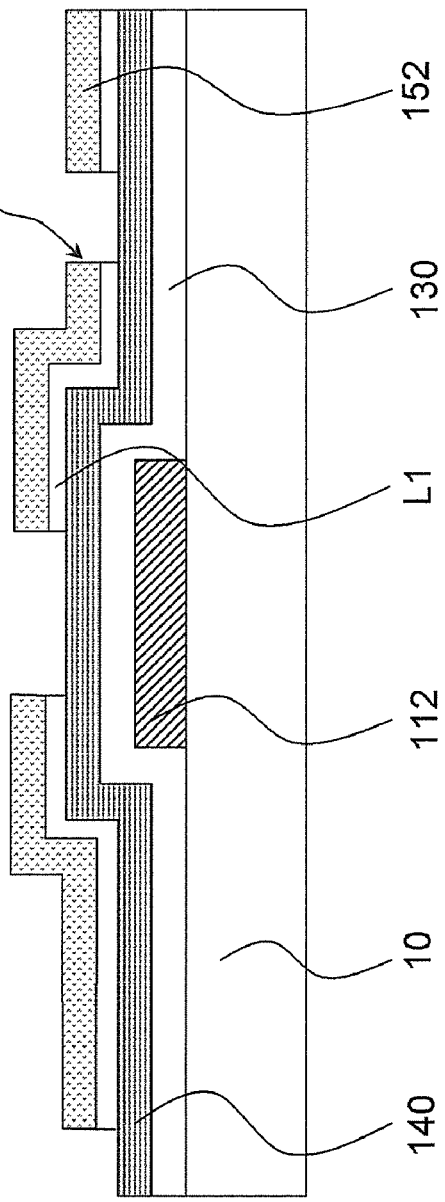
Figure 2J:
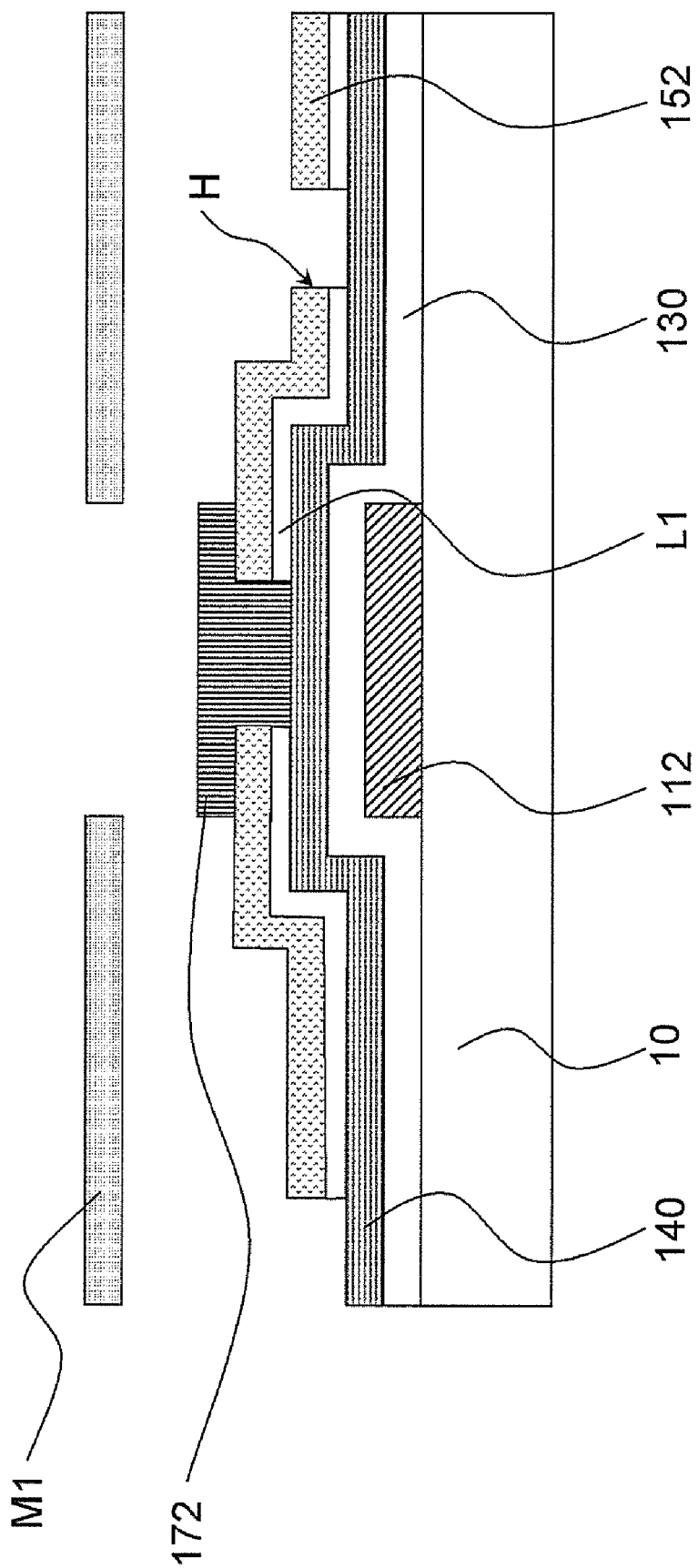
Figure 2N:
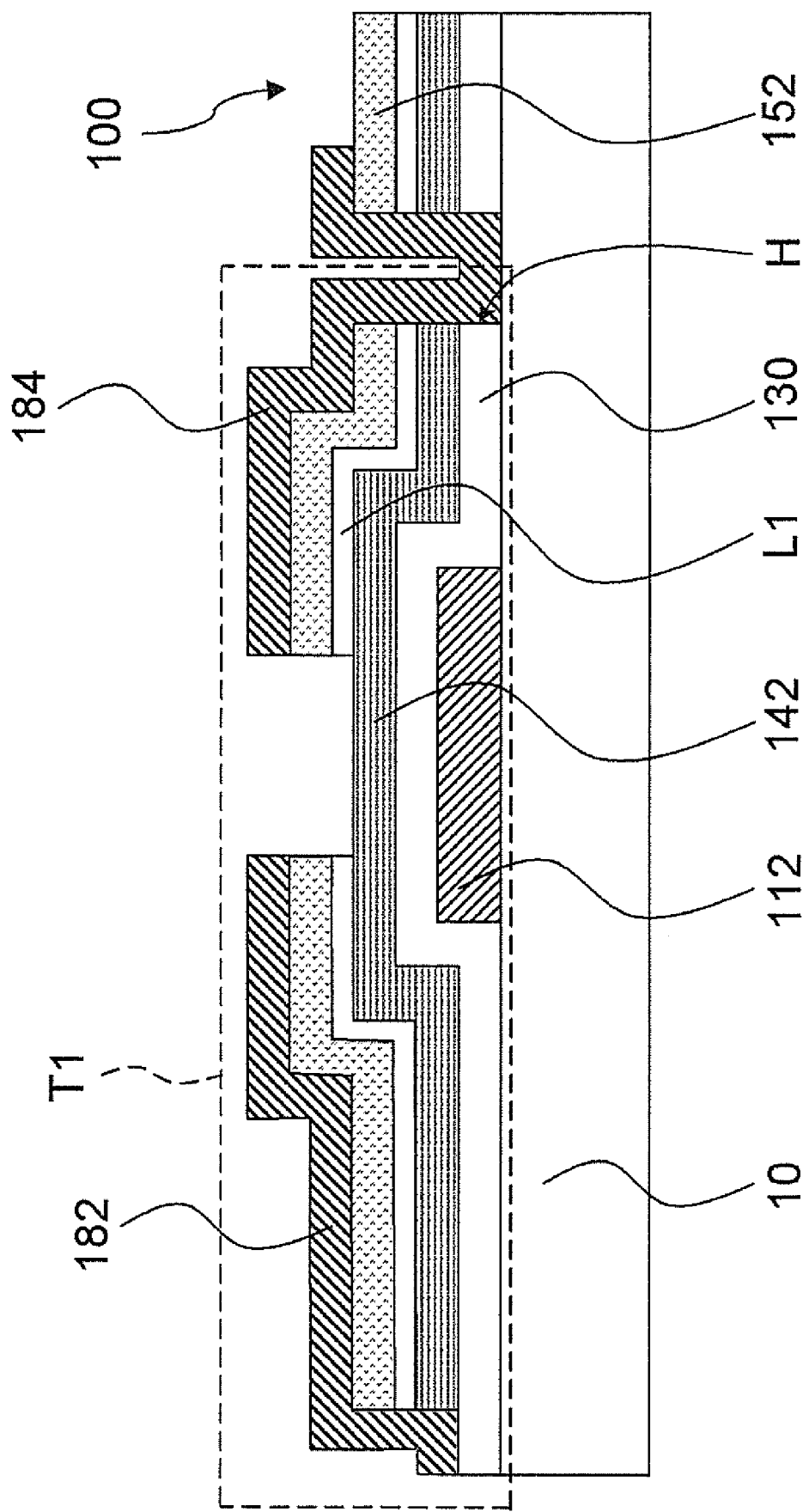

FIGS. 2A to 2N depict cross-sectional views of a method for manufacturing a pixel structure according to a first embodiment. First, referring to FIGS. 2A to 2D, the method for manufacturing the pixel structure of this embodiment can be used to manufacture a pixel structure for a thin film transistor with a bottom gate. This manufacturing method includes the following steps. First, a gate 112 is formed on a substrate 10 by using a first mask M1. The substrate 10 is, for example, a glass substrate, a quartz substrate, or any substrate with a suitable material. As shown in FIG. 2A, the method of forming the gate 112 includes, for example, forming a first conductive layer 110 on the substrate 10 through physical vapor deposition (PVD), or any suitable methods such as sputtering or evaporation, wherein the first conductive layer 110 comprises, e.g., Al, Mo, MoN, Ti, TiN, Cr, CrN, or any suitable material. In one embodiment, the first conductive layer 110 comprises, for example, TiN/Al/Ti/TiN composite layer, wherein the thickness of Al is, for example, between 500 and 1000 angstroms, and the thicknesses of Ti and TiN are, for example, between 300 and 1000 angstroms. Next, a photo-resist layer 120 is coated on the first conductive layer 110. The photo-resist layer 120 is, for example, a negative photo-resist.

As shown in FIG. 2B, subsequently an exposing process and a developing process are carried out using the first mask M1 to form a photo-resist layer 122. Next, as shown in FIG. 2C, a dry etching or the wet etching process is carried out using the photo-resist layer 122 as a mask to remove a portion of the first conductive layer 110 not covered by the photo-resist layer 122. Thus, a gate 112 is formed. As shown in FIG. 2D, after the formation of the gate 112, a stripping process is carried out to remove the photo-resist layer 122.

Referring to FIG. 2E, a dielectric layer 130 is then formed over the substrate 10 to cover the gate 112. The dielectric layer 130 is formed, for example, through plasma enhanced chemical vapor deposition (PECVD) at a process temperature lower than 300° C., or through any other suitable method. In addition, the dielectric layer 130 comprises, for example, SiNx, SiOx, SiOxNy, or any other suitable material, and the thickness of the dielectric layer 140 is, for example, between 1500 and 3000 angstroms.

Referring to FIG. 2F, after the formation of the dielectric layer 130, a semiconductor material layer 140 and a second conductive layer 150 are sequentially formed over the dielectric layer 130. In this embodiment, in order to improve the electrical property, an ohmic contact layer L1 may be formed on the semiconductor material layer 140 after the formation of the semiconductor material layer 140, however, the present invention is not limited to forming the ohmic contact layer L1. The method of forming the semiconductor material layer 140 is, for example, achieved through chemical vapor deposition or another suitable method. The semiconductor material layer 140 comprises, for example, an amorphous silicon (α-Si), poly silicon or any other suitable material. The ohmic contact layer L1 may be formed by chemical vapor deposition or any other suitable method. The ohmic contact layer L1 comprises, for example, an N type doped amorphous silicon or any other suitable material. The second conductive layer 150 may be formed vacuum sputtering or any other suitable method. The second conductive layer 150 comprises, for example, indium tin oxide (ITO), indium zinc oxide (IZO), or any other suitable material.

Referring to FIGS. 2G to 2I, the second conductive layer 150 is then patterned to form a pixel electrode 152 by using a second mask M2. As shown in FIG. 2G, the pixel electrode 152 may be formed, for example, as follows. First, a photo-resist layer (not shown) is coated on the second conductive layer 150. The photo-resist layer is etched using the second mask M2 to form a patterned photo-resist layer 162. Then, as shown in FIG. 2H, the second conductive layer 150 is etched using the patterned photo-resist layer 162 as a mask to form a pixel electrode 152. During the formation of the pixel electrode 152, a contact hole H may also be formed for exposing part of the semiconductor material layer 140. As shown in FIG. 2I, after the formation of the pixel electrode 152, a dry etching process is first carried out for patterning the ohmic contact layer L1, and then a stripping process is carried out to remove the photo-resist layer 152. It should be particularly noted that, although the contact hole H and the pixel electrode 152 are formed at the same time in this embodiment, it is unnecessary for the contact hole H to be formed simultaneously with the pixel electrode 152.

Referring to FIG. 2J, a patterned photo-resist layer 172 is formed over the substrate 10 by using the first mask M1 again for protecting the semiconductor material layer 140 above the protect gate 112. The patterned photo-resist layer 172 may be formed by the following process. First, a photo-resist layer (not shown) is coated on the semiconductor material layer 140 and the pixel electrode 152. Next, the photo-resist layer is etched using the first mask M1 as a mask to form the patterned photo-resist layer 172.

Referring to FIGS. 2K and 2L, the semiconductor material layer 140 is patterned to form a semiconductor layer 142 using the pixel electrode 152 and the patterned photo-resist layer 172 as masks. A dry etching or a wet etching process may be carried out to pattern the semiconductor material layer 140 to form the semiconductor layer 142 such that a portion of the dielectric layer 130 is exposed by the contact hole H. Next, an etching process is carried out using the pixel electrode 152 and the patterned photo-resist layer 172 as masks to pattern the dielectric layer 130 such that a portion of the substrate 10 is exposed. Then, as shown in FIG. 2L, a stripping process is carried out to remove the patterned photo-resist layer 172. It should also be noted that, the etching process for patterning the dielectric layer 130 is an optional process and may not be necessary.

Referring to FIGS. 2M to 2N, a source 182 and a drain 184 are formed over the substrate 10 by using a third mask M3. As shown in FIG. 2M, the method of forming the source 182 and the drain 184 is illustrated as follows. First, a third conductive layer 180 is deposited over the substrate 10 to cover the semiconductor layer 142, the pixel electrode 152 and a portion of the substrate 10. Next, a photo-resist layer (not shown) is coated on the third conductive layer 180. The photo-resist layer is etched using the third mask M3 as an etching mask to form a patterned photo-resist layer 192. As shown in FIG. 2N, a portion of the third conductive layer 180 is etched using the patterned photo-resist layer 192 as a mask and then the patterned photo-resist layer 192 is removed so that the source 182 and the drain 184 are formed. Here, the thin film transistor T1 is formed, with the drain 184 electrically connected to the pixel electrode 152. Thus, the fabrication of the pixel structure 100 is completed.

Accordingly, the method for manufacturing the pixel structure according to an embodiment of the present invention, only four mask steps are used, wherein two mask steps of the four mask steps use the same mask. Thus, the fabrication cost of the pixel structure is substantially reduced and the fabrication yield is substantially increased. Moreover, the fabrication throughput is substantially increased.

Figure 3A:
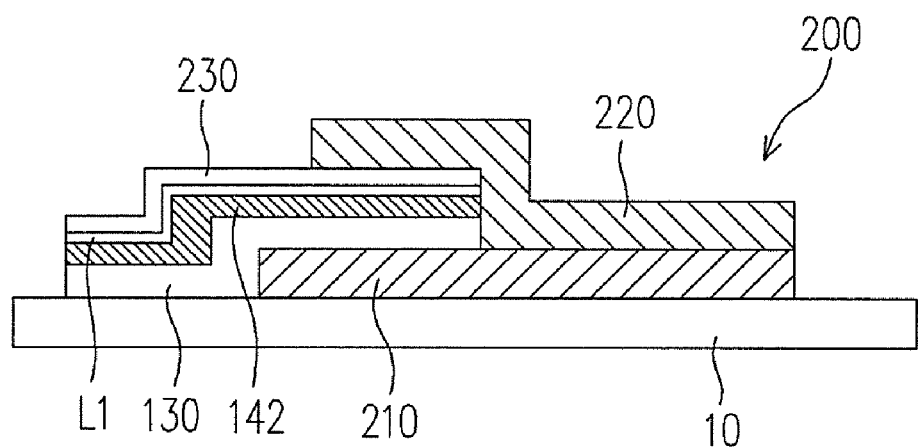
FIGS. 3A to 3C depict different terminal structures respectively.
Figure 3B:
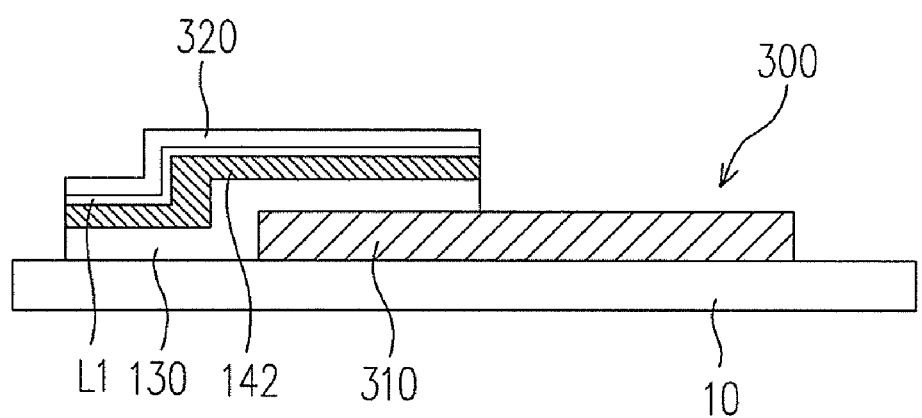
Figure 3C:
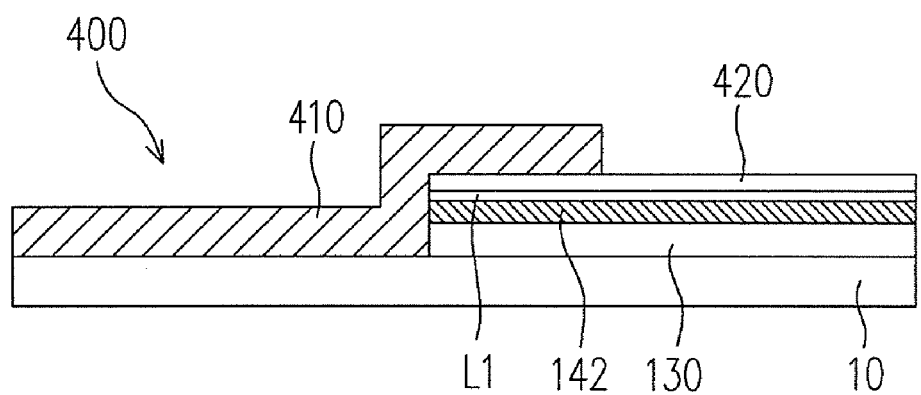

The method for manufacturing the pixel structure of this embodiment may also be used for manufacturing terminal structures. FIGS. 3A to 3C depict different terminal structures 200, 300, 400 respectively. These terminal structures 200, 300, 400 can be used for, for example, a wiring area of an active element array substrate (not shown) as a bonding pad, an inner short ring, or any other element. Furthermore, the structure of the terminal structures 200, 300, 400 may vary depending on the design of the mask. It should be noted that the metal wires 210, 220 and the transparent wire 230 of the terminal structure 200 are formed simultaneously along with the formation of the gate 112, the source 182, and the pixel electrode 152 of the pixel structure 100 respectively. Similarly, the metal wire 310 and the transparent wire 320 of the terminal structure 300 are formed simultaneously along with the formation of the gate 112 and the pixel electrode 152 of the pixel structure 100. The metal wire 410 and the transparent wire 420 of the terminal structure 400 are formed simultaneously along with the formation of the source 152 and the pixel electrode 152 of the pixel structure 100.

Second Embodiment

Figure 4A:
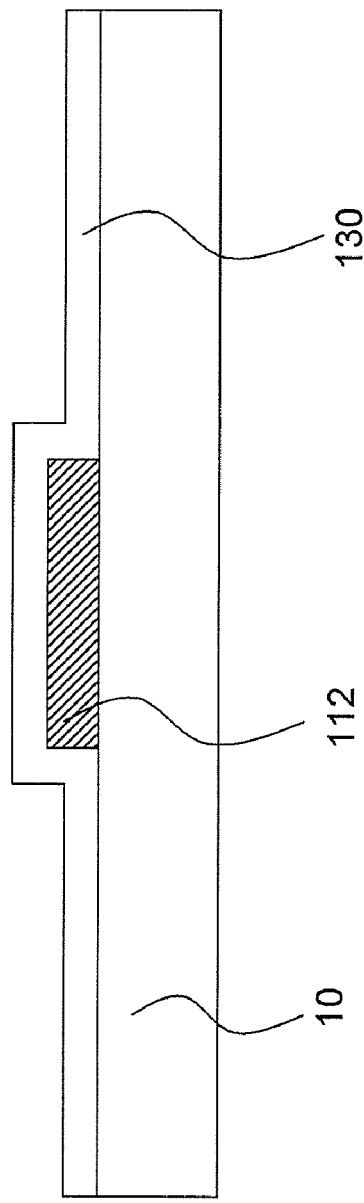

FIGS. 4A to 4K depict cross-sectional views of the pixel structure of according to a second embodiment. Referring to FIG. 4A, the method for manufacturing the pixel structure of this embodiment includes the following steps. First, a gate 112 is formed on a substrate 10 by using a first mask M1, and a dielectric layer 130 is formed over the substrate 10 to cover the gate 112. The first mask M1 and the substrate 10 are the same as that described in the first embodiment; and the manufacturing method, the material, and the thickness of the gate 112 and the dielectric layer 130 are the same as those described in the first embodiment.

Figure 4B:
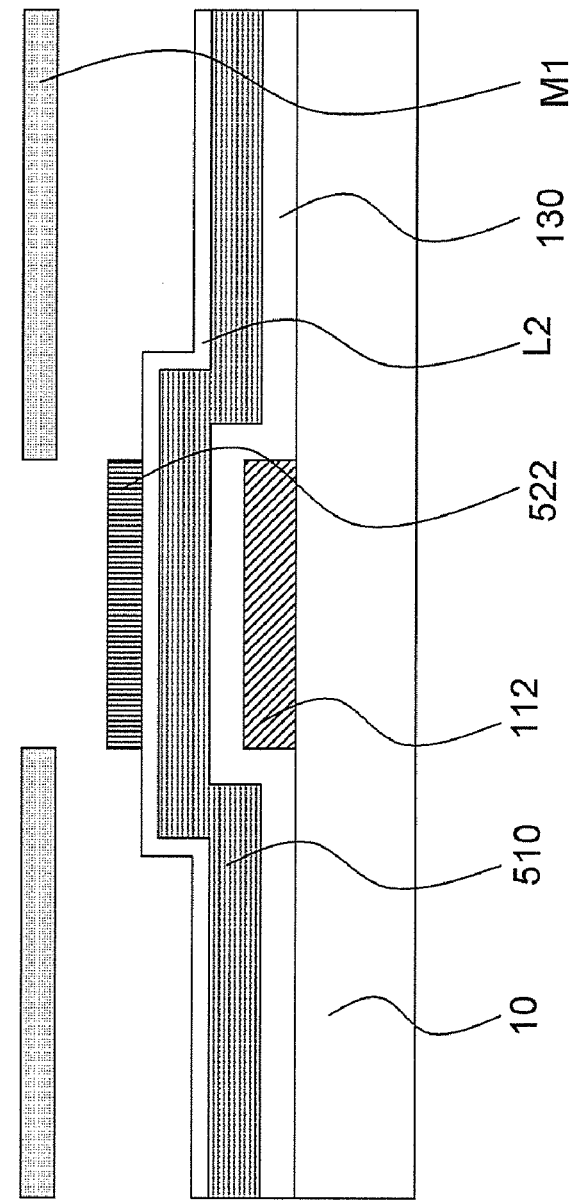

Referring to FIGS. 4B to 4E, a semiconductor layer 512 is then formed on the dielectric layer 130 by using the first mask M1 again. The method of forming the semiconductor layer 512 includes the following steps. First, as shown in FIG. 4B, first a semiconductor material layer 510 is formed on the dielectric layer 130; and a photo-resist layer (not shown) is formed on the semiconductor material layer 510; and the photo-resist layer is etched using the first mask M1 as a mask to form a patterned photo-resist layer 522. Then, as shown in FIG. 4C, an etching process is carried out to pattern the semiconductor material layer 510 using the patterned photo-resist layer 522 as a mask to form the semiconductor layer 512. Subsequently, a stripping process is carried out to remove the patterned photo-resist layer 522. It should be noted that, after the semiconductor material layer 510 is formed, an ohmic contact layer L2 is formed on the semiconductor material layer 510. Before the semiconductor material layer 510 is patterned, the ohmic contact layer L2 is patterned using the patterned photo-resist layer 522 as a mask.

Referring to FIGS. 4D to 4E, a source 532 and a drain 534 are formed over the substrate by using a second mask M4. As shown in FIG. 4D, the method of forming the source 532 and the drain 534 is illustrated as follows. First, a second conductive layer 530 is deposited on the dielectric layer 130 and the semiconductor layer 512; and a photo-resist layer (not shown) is coated on the second conductive layer 530. The photo-resist layer is etched using the second mask M4 as a mask to form the patterned photo-resist layer 542. Next, as shown in FIG. 4E, an etching process is carried out to remove a portion of the second conductive layer 530 by using the patterned photo-resist layer 542 as a mask to form the source 532 and the drain 534. After the source 532 and the drain 534 are formed, a stripping process is carried out to remove the patterned photo-resist layer 542. It should be noted that, the step of forming the source 532 and the drain 534 further includes carrying out the etching process by using the source 532 and the drain 534 as a mask to pattern the dielectric layer 130 and expose a portion of the substrate 10. It should be noted that, the etching process for patterning the dielectric layer 130 is optional and may be not essential.

Figure 4G:
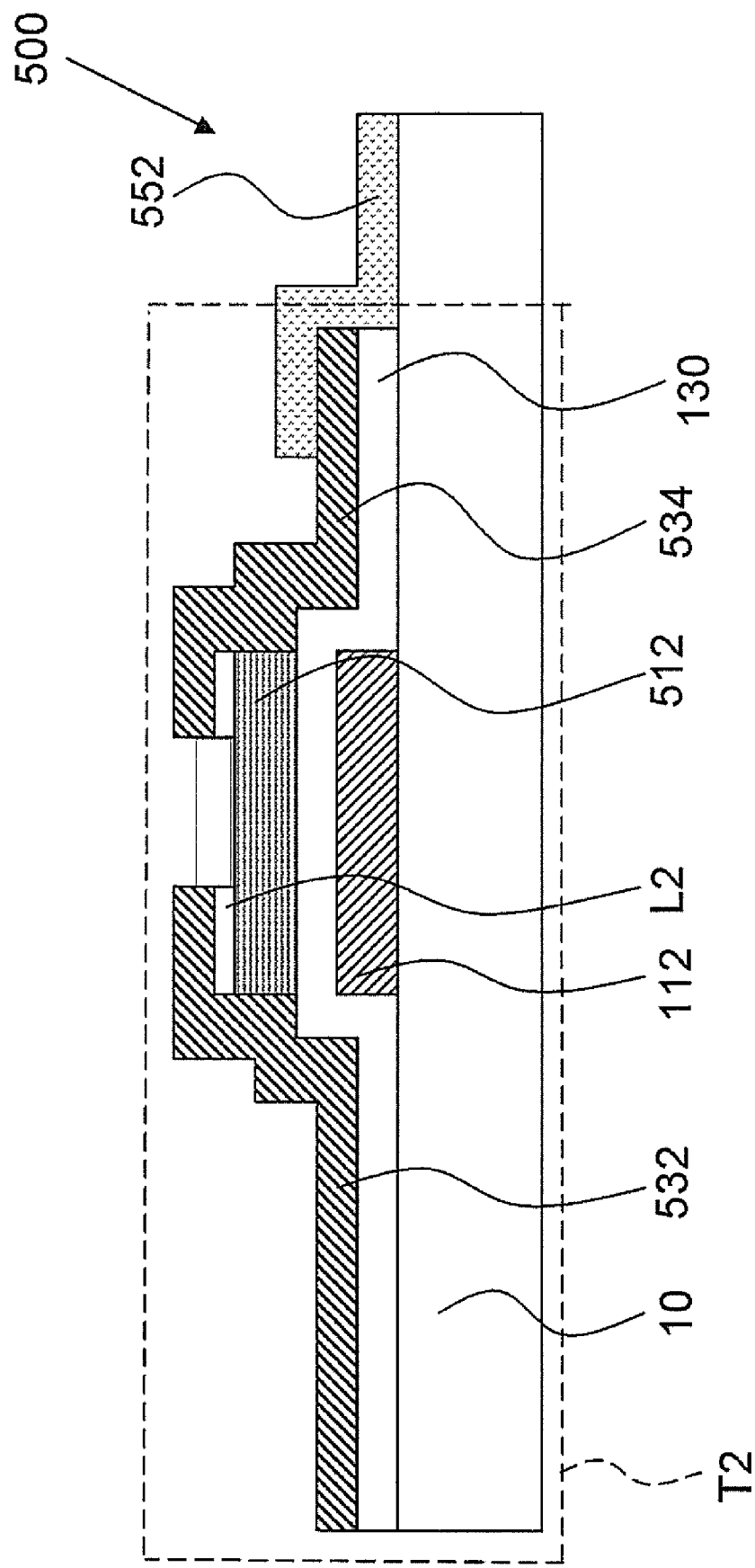

Referring to FIGS. 4F to 4G, a pixel electrode 552 is formed over the substrate 10 by using a third mask M5. The pixel electrode 552 is electrically connected to the drain 534. As shown in FIG. 4F, the method of forming the pixel electrode 552 is illustrated as follows. First, a third conductive layer 550 is deposited over the substrate 10 to cover the source 532, the drain 534 and the channel layer 512; and a photo-resist layer (not shown) is formed on the third conductive layer 550. Next, the photo-resist layer is etched using the third mask M5 to form a patterned photo-resist layer 562. Subsequently, as shown in FIG. 4G, the etching process is carried out using the patterned photo-resist layer 562 as a mask to remove a portion of the third conductive layer 550 and thereby form the pixel electrode 552. Next, after the pixel electrode 552 is formed, a stripping process is carried out to remove the patterned photo-resist layer 562. Thus, the fabrication of the pixel structure 500 is completed.

Thus, the method for manufacturing the pixel structure according to this embodiment also uses only four mask steps, wherein two mask steps use the same mask. Therefore, the fabrication throughput is increased, and the overall fabrication cost is substantially reduced.

Figure 5A:
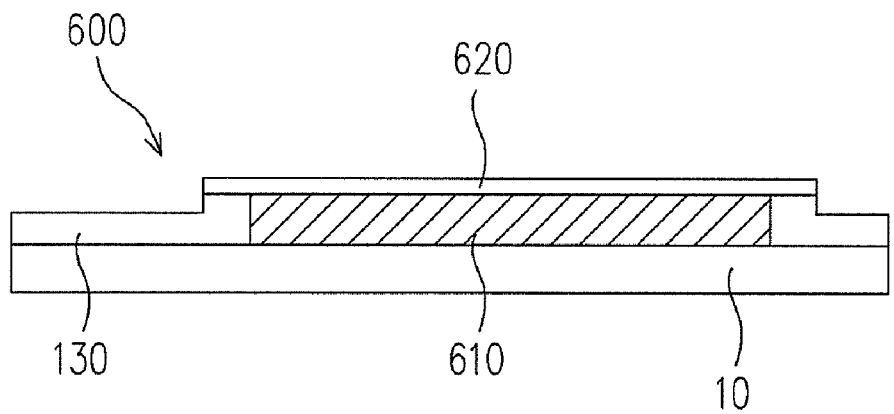
FIGS. 5A to 5C depict different terminal structures respectively.
Figure 5B:
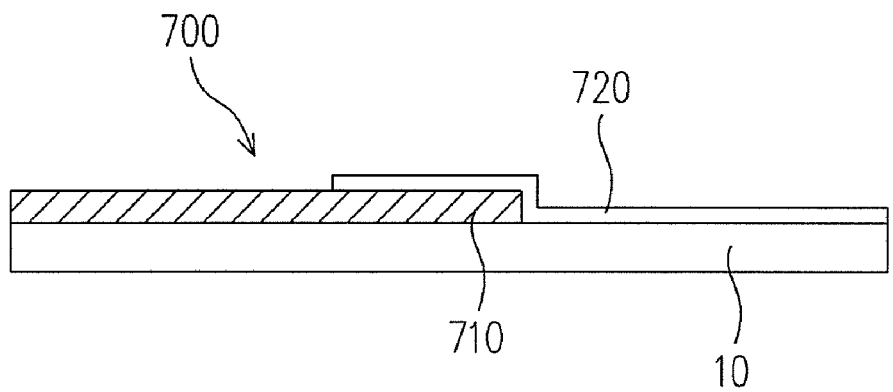
Figure 5C:
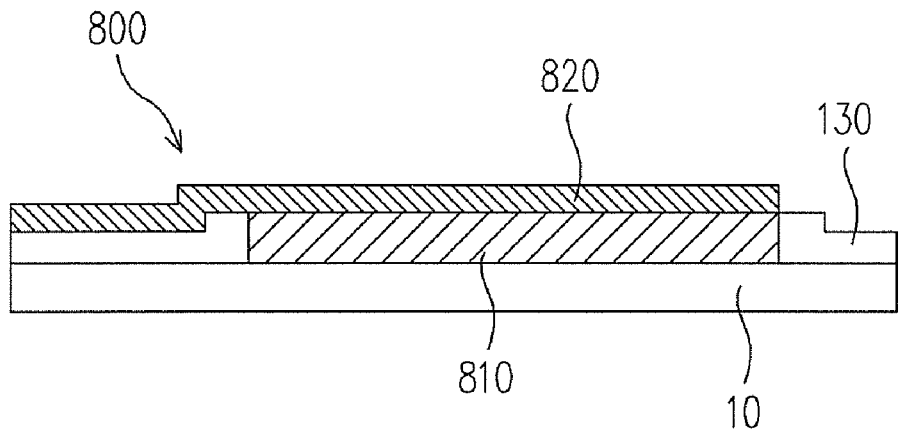

The method for manufacturing the pixel structure of this embodiment can also be used for manufacturing the terminal structures. FIGS. 5A to 5C depict different terminal structures 600, 700, 800 respectively. It should be noted that, the metal wire 610 and the transparent wire 620 of the terminal structure 600 are formed simultaneously along with the formation of the gate 112 and the pixel electrode 552 of the pixel structure 500 respectively. Similarly, the metal wire 710 and the transparent wire 720 of the terminal structure 700 are formed simultaneously along with the formation of the source 532 and the pixel electrode 552 of the pixel structure 500; and the metal wires 810, 820 of the terminal structure 800 are formed simultaneously along with the formation of the gate 112 and the source 552 of the pixel structure 500 respectively.

In summary, the method for manufacturing the pixel structure provided by the present invention has at least the following advantages.

1. The method for manufacturing the pixel structure provided by the present invention uses only four mask steps, wherein two mask steps use the same mask, so that the masking cost may be substantially reduced.

2. The method for manufacturing the pixel structure provided by the present invention uses only four mask steps to manufacture the pixel structure, therefore the fabrication throughput may be increased and the overall fabrication cost may be reduced.

3. Due to the relatively fewer process steps, the number of defects occurring during the fabrication of the pixel structure may be decreased, thus the fabrication yield may be effectively promoted.

4. The method for manufacturing the pixel structure provided by the present invention is compatible with current processes, such that no additional processes or devices are required.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for manufacturing a pixel structure, the method comprising:

forming a first conductive layer on a substrate;

patterning the first conductive layer using a first mask as an etching mask to form a gate;

forming a dielectric layer over the substrate to cover the gate;

forming a semiconductor material layer on the dielectric layer;

patterning the semiconductor material layer using the first mask as an etching mask to form a semiconductor layer on the dielectric layer;

forming a second conductive layer over the substrate;

patterning the second conductive layer using a second mask as an etching mask to form a source/drain over the substrate;

forming a third conductive layer over the substrate; and patterning the third conductive layer using a third mask as an etching mask to form a pixel electrode over the substrate, wherein the pixel electrode is electrically connected to the drain.

2. The method for manufacturing the pixel structure as claimed in claim 1, wherein the step of patterning the semiconductor material layer includes:

forming a patterned photo-resist layer on the semiconductor material layer by using the first mask;

patterning the semiconductor material layer using the patterned photo-resist layer as an etching mask to form the semiconductor layer; and removing the patterned photo-resist layer.

3. The method for manufacturing the pixel structure as claimed in claim 2, further comprising a step of forming an ohmic contact layer on the semiconductor material layer after the step of forming the semiconductor material layer, and a step of patterning the ohmic contact layer using the patterned photo-resist layer as an etching mask before the step of patterning the semiconductor material layer.

4. The method for manufacturing the pixel structure as claimed in claim 1, wherein the step of forming the source/drain further includes patterning the dielectric layer using the source/drain as an etching mask to expose a portion of the substrate.

* * * * *